Oct. 11, 1955 J. J. HUPERT 2,720,591

FREQUENCY MODULATION TRANSMITTER

Filed Feb. 1, 1950 2 Sheets-Sheet 1

INVENTOR.
Julius J. Hupert
BY
Moore, Olson & Trexler
attys.

FREQUENCY MODULATION TRANSMITTER

Filed Feb. 1, 1950

2 Sheets-Sheet 2

INVENTOR.
Julius J. Hupert
BY
Moore, Olson & Trexler
Att'ys.

United States Patent Office 2,720,591

Patented Oct. 11, 1955

2,720,591

FREQUENCY MODULATION TRANSMITTER

Julius J. Hupert, River Forest, Ill., assignor to A. R. F. Products, Inc., River Forest, Ill., a corporation of Illinois Application February 1, 1950, Serial No. 141,771

4 Claims. (Cl. 250—36)

This invention is concerned generally with a frequency modulated transmitter, and more particularly with modulating and frequency stabilizing means for such a transmitter.

Various systems for frequency modulating a radio carrier wave are well-known in the art. Among these is the system using a reactance tube which varies the tuning of an oscillator circuit in response to a modulating signal. This invention is in part concerned with an improved circuit for reactance tube frequency modulation.

Phase shifting networks are utilized to operate tubes as reactances in frequency modulation and a considerable amount of power is wasted in such network. This invention is also concerned with utilizing the power normally dissipated in a reactance tube phase shifting network.

For proper operation of a frequency modulated transmitter it is absolutely essential that the carrier frequency should be maintained constant. This invention is also concerned with means for maintaining a constant carrier frequency in a frequency modulated transmitter.

In conventional reactance tube modulating circuits a capacitor is connected across the plate and control grid of the reactance tube and a resistor is connected between the control grid and cathode. The reactance tube is connected to the oscillator providing the carrier frequency in parallel with the oscillator tube and on the opposite side of the tube from the tuned circuit. Both the introduction of the external capacitor and the introduction of the reactance tube itself on the side of the oscillator opposite the tuned circuit add an undesirable amount of stray capacity to the circuit.

It is an object of the present invention to provide a reactance tube frequency modulation circuit in which the necessity of an external capacitor in a phase shifting network is obviated.

A more specific object is the provision of a reactance tube circuit as set forth in the foregoing object in which the internal plate-grid capacity of the reactance tube is used as part of the phase shifting network.

A further object of this invention is the provision of a reactance tube modulation circuit in which stray capacity is kept to a minimum by constructing the circuit in a symmetrical fashion with one tube acting as an oscillator and another as a reactor.

Yet another object of this invention is the provision of a reactance tube frequency modulation circuit in which the power normally dissipated in the phase shifting network is developed in a useful load.

A further object of this invention is the provision of a reactance tube frequency modulation circuit in which a high value of resistance is transformed to the low value required in a phase shifting network.

A specific object of this invention is the carrying out of the last two foregoing objects by taking the output of the reactance tube oscillator circuit from the grid of the reactance tube.

In conventional frequency stabilizing circuits, amplitude or phase discriminators are utilized for purposes of automatic frequency control. The crossover or zero correcting voltage frequency in such circuits depends on the setting of one or more tuned circuits which necessarily have non-linear calibrations or controls.

Among other objects of this invention is the provision of a frequency stabilizing or automatic frequency control circuit in which the crossover frequency may be readily changed by the adjustment of a single control.

A further object of this invention is the provision of a frequency stabilizing circuit as set forth in the last foregoing object in which the calibration of the tuning control is perfectly linear with frequency.

Another object of this invention is the provision of an automatic frequency control discriminator of simplified construction capable of operating at extremely low and variable frequencies.

Yet another object is the provision of an automatic frequency control circuit in which the ratio of maximum to minimum frequency that can be utilized for automatic frequency control purposes is far in excess of the ratio that can be provided by tunable discriminators of conventional types.

Other and further objects and advantages of the present invention will be apparent from a perusal of the following description in which.

Figure 1:
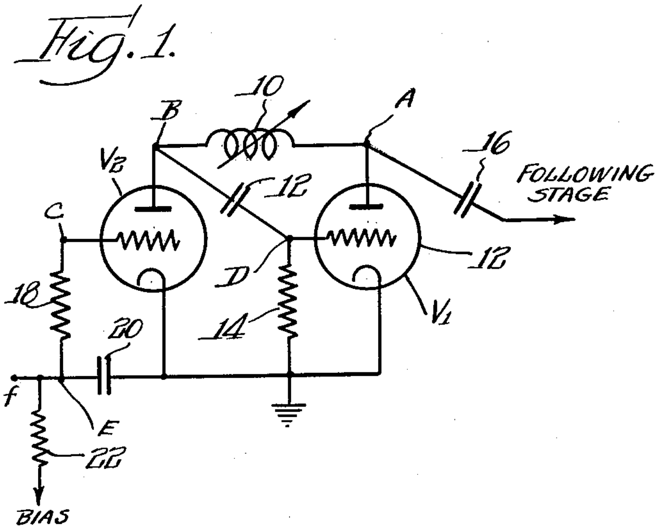
Figure 1 is a schematic diagram of an improved reactance tube modulation circuit.

Referring to Figure 1 first, there will be seen an oscillator comprising an oscillator tube V1, a tunable inductance 10, a capacitance 12 and a resistor 14. A coupling capacitor 16 is connected to the plate of the tube V1 to couple the output therefrom to the following stage which, for example, may be an amplifier or an antenna. A reactance tube V2 has its plate connected to the junction of the inductance 10 and capacitance 12 and its cathode is connected to the cathode of the oscillator tube V1. Both of the cathodes are grounded. A phase shifting resistor 18 of small value is connected to the grid of the tube V2 and through a radio frequency by-pass capacitor 20 to the cathode of the tube V2. Bias is supplied to the grid of the tube V2 through a resistor 22 connected to the junction between the resistor 18 and capacitor 20. It is evident from an examination of the diagram of Figure 1 that there is less stray capacitance in the circuit than in conventional circuits and that the circuit could be changed to a push-pull oscillator without disturbing the ratio of inductance to capacitance, and that this ratio is higher than normal. The difference in action of the two tubes illustrated is due in large measure to the widely different values of grid resistors used. For illustrative purposes the resistor 14 may be assumed to be of the order of 50,000 ohms and the resistor 18 may be assumed to be of the order of 3 ohms.

Figure 2:
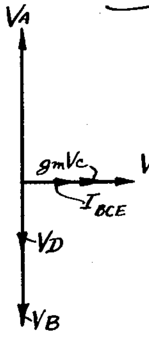
Figure 2 is a vector diagram of the voltage and current relationships in the circuit of Figure 1.

In the circuit diagram of Figure 1 the plate of the tube V1 is identified by the reference character A, the plate of V2 by B, the grid of V2 by C, the grid of V1 by D, and the junction between the resistors 18 and 22 and the capacitance 20 by E. In Figure 2 the voltages $V_A$, $V_B$, $V_C$ and $V_D$ between the points A, B, C and D, respectively and ground are illustrated. As it is only the phase relationships which are important, no attempt has been made to illustrate the relative magnitude of these voltages. As is normally the case with oscillators the voltages $V_A$ and $V_B$ are 180° out of phase, it being understood that the tuned circuit of the oscillator illustrated comprises the inductance 10 and the internal capacitance of the tube V1. The grid voltage $V_D$ of the oscillator tube V1 is in phase with $V_B$ due to the large value of the grid resistor 14 compared with the impedance of the coupling capacitor 12 and the internal grid-to-cathode impedance of the oscillator tube V1.

The internal grid-to-plate capacitance of the reactance tube V2 presents a high impedance compared to the resistance of the grid resistor 18 and accordingly the radio frequency current flowing through this capacitance and resistor is predominantly capacitive and leads the voltage $V_B$ by substantially 90°. This current is labeled $I_{BCE}$ in Figure 2. The voltage $V_C$ is of course in phase with this current and leads the voltage $V_B$ by 90°. The radio frequency plate current of the tube V2 caused by emission of the tube equals $g_mV_C$ and is in phase with $V_C$ and consequently leads $V_B$ by 90°. Therefore the tube V2 represents a capacitive impedance. This capacitive impedance may be made to vary at a modulation frequency rate by applying the modulating frequency at the point E to vary $g_m$ and the variation in capacity of the tube V2 alters the tuning of the oscillator to vary the oscillator frequency in response to the modulating frequency.

As is evident from the foregoing description, there is a current through the grid resistor 18 of the reactance tube and this current will cause a power loss in the resistor. The power loss increases with the power required, with the maximum deviation required, and with the frequency of operation. The problem becomes more serious with the increase of each of these factors. By taking the output of the reactance tube-oscillator circuit from the grid of the reactance tube, it is possible to develop the power which is otherwise wasted in the grid resistor in a useful load. Little change is needed in the circuit previously described as may be seen with reference to Figure 3. The same identifying symbols are used for identical parts including the oscillator tube V1, reactance tube V2, inductance 10, capacitor 12 and grid resistor 14. The relative positions of tubes V1 and V2 have been reversed from the showing of Figure 1 to conform with conventional circuit diagrams wherein the signal proceeds toward the right. Modulation is supplied along with bias through a resistor 24 of high value. A resistor 26 similar to the resistor 18 is coupled to the grid of the reactance tube V2 through a transmission line 28 which may be of the coaxial type and a coupling capacitor 30. One side of the resistor 26 and line 28 is grounded as indicated on the drawing. The resistor 26 may be a useful load and may be of the desirable value which would be necessary if the cable were omitted and the resistor were inserted directly in the grid circuit.

Figure 3:
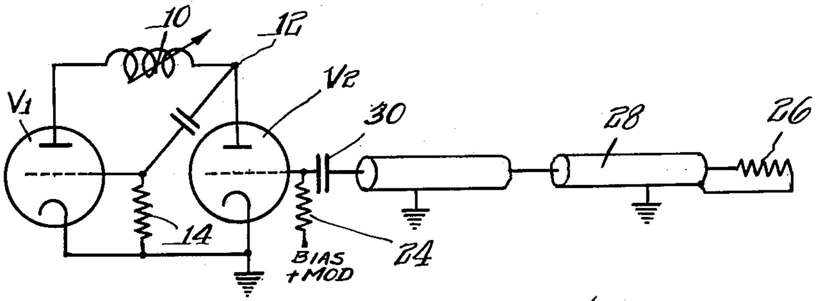
Figure 3 is a circuit diagram of a modification of the circuit shown in Figure 1 in which normally wasted power is developed in a useful load.
Figure 4:
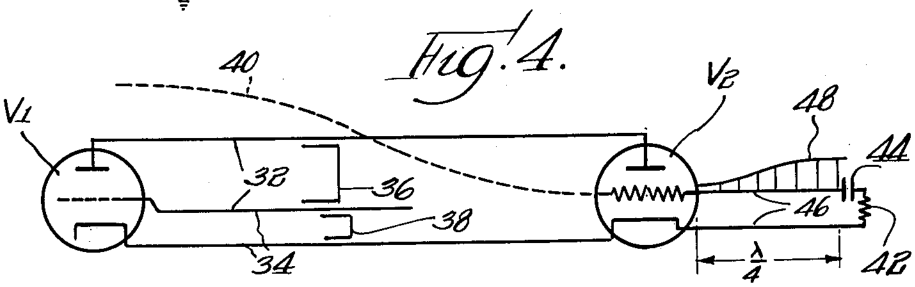
Figure 4 is a circuit diagram of a modification of the circuit shown in Figure 3.

As shown in Figure 4, the resistor in which the useful load is developed need not be of the same value as the value required at the grid. As illustrated the oscillator tube V1 and reactance tube V2 may be the same as those shown in Figures 1 and 3. A pair of transmission lines 32 and 34 are used to provide coupling and tuned circuits. The transmission lines are tuned by adjustable shorting bars 36 and 38. The voltage to ground as it varies between the oscillator plate and the reactance tube grid is illustrated at 40. In this embodiment the useful load may be a resistor 42 of high value which is coupled by means of a capacitor 44 to a quarter wave length transmission line 46 which transforms its resistance to the low value necessary at the grid of the reactance tube V2. The voltage to ground as it varies from the resistor to the grid of the reactance tube V2 is illustrated at 48.

Figure 5:
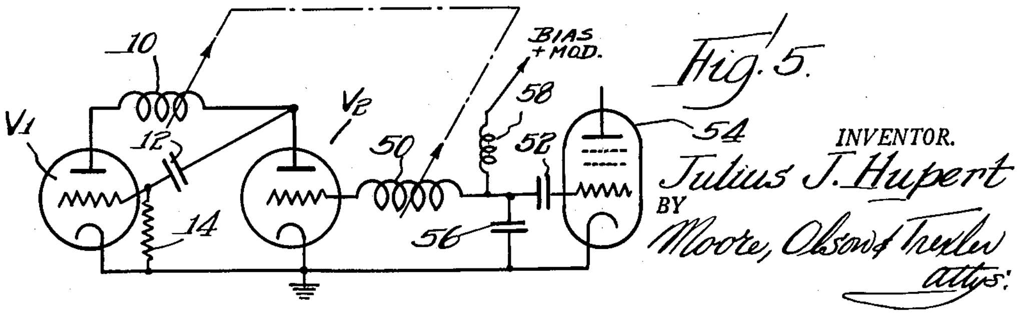
Figure 5 is a schematic diagram of a practical application of the circuit of Figure 3.

A practical application of the circuits of Figures 3 and 4 is shown in Figure 5 in which a useful load is utilized for developing the power normally wasted in the grid resistor. The oscillator circuit may be the same as that previously illustrated having the tube VI, tunable inductance 10, coupling capacitor 12 and grid resistor 14 with the reactance tube V2 connected thereto as shown in Figures 1 and 3. The grid of the reactance tube V2 is connected directly to a tunable inductance 50 which is connected in turn to a grid coupling capacitance 52 of an amplifier tube 54 and is also connected to ground through a capacitance 56. Bias and modulation are supplied through a radio frequency choke 58 to the junction between the inductance 50 and capacitors 52 and 56. The inductance 50 and the capacitance 56 are tuned to series resonance at the frequency of the oscillator so as to present a resistance to the grid of the reactance tube and also so that a magnified voltage will be available to drive the grid of the amplifier tube 54. To keep this series circuit tuned to the frequency of the oscillator, the inductance 50 may be ganged with the inductance 10 so that the two may be tuned concurrently.

Figures 6, 7:
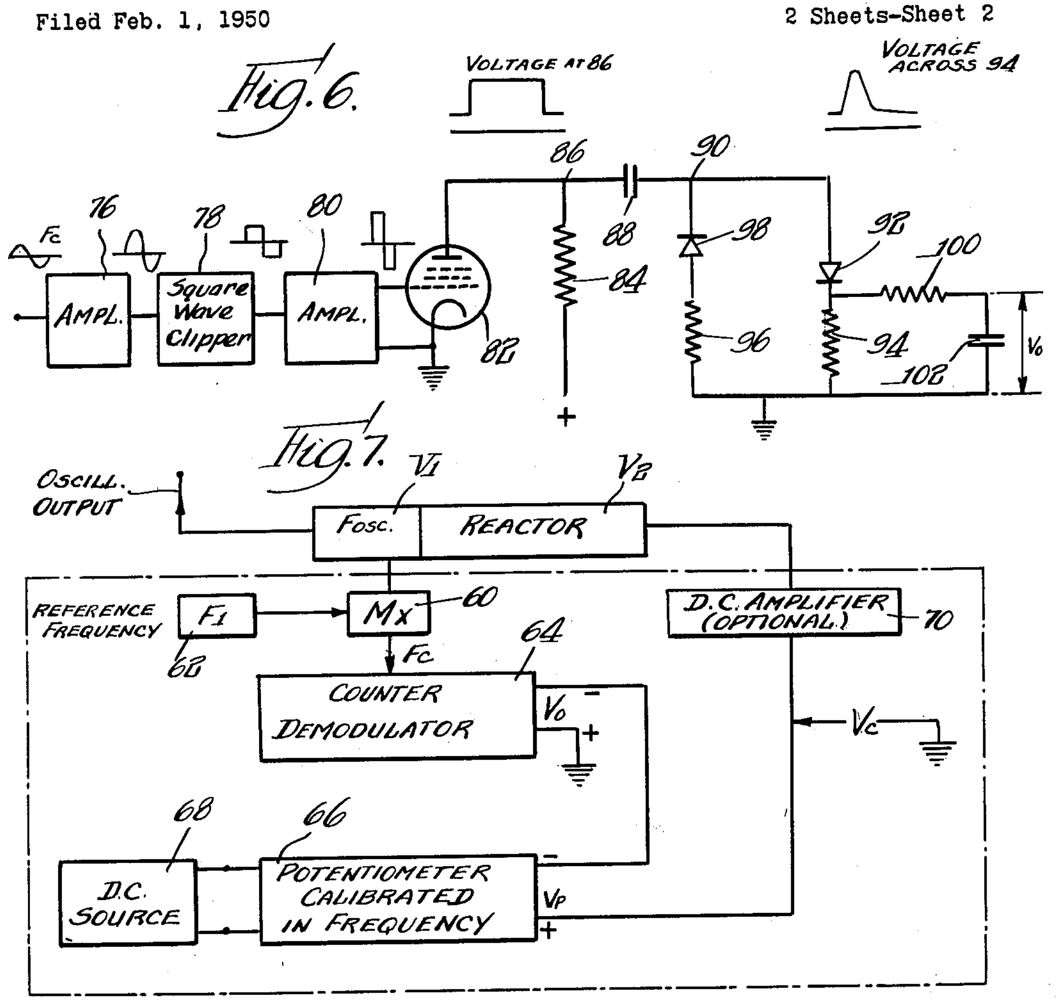
Figure 6 is a schematic diagram of a counter demodulator.
Figure 7 is a block diagram of a frequency stabilizing circuit.

As noted previously, it is necessary to maintain the frequency of the carrier wave at a precise predetermined value. If it is not, the foregoing disclosure is of considerably reduced value. Accordingly, in Figures 6 and 7 I have presented circuits for maintaining the carrier frequency constant. With reference to Figure 7, a circuit is disclosed involving an oscillator and a reactor which for the sake of convenience and continuity are designated V1 and V2 respectively, which symbols were previously used more specifically to indicate the oscillator and reactor tubes. The output in this case is illustrated as taken from the oscillator, as was the case in Figure 1. An additional output is taken from the oscillator V1 at the frequency of oscillation, $F_{osc}$, as indicated on the oscillator, and is supplied to a mixer 60. A frequency reference standard 62 which may be a crystal controlled oscillator provides a frequency $F_1$ to the mixer 60. The mixer 60 produces a frequency $F_c$ which is within the frequency range that can be handled by a counter demodulator 64 to which it is supplied. The counter demodulator, as will be explained later, provides an output voltage $V_o$ which is dependent only on the value of the frequency $F_c$ supplied to it and which is proportional to the frequency. The voltage $V_o$ obtained from the counter demodulator is connected in series opposition with a potentiometer 66 calibrated in frequency and supplied from a stabilized direct current voltage source 68. The potentiometer is calibrated in terms of frequency and its calibration curve is a straight line which is an exact replica of $V_o=f(F_c)$ characteristic of the counter demodulator and is illustrated in Figure 8.

The output voltage $V_p$ of the potentiometer 66 being connected in series opposition with the output voltage $V_o$ of the counter demodulator 64 produces a voltage $V_c$ which, as is indicated in Figure 7, may be supplied to a D. C. amplifier 70 which in turn has its output connected to the grid of the reactor V2. The D. C. amplifier 70 is not essential and in many instances may be omitted.

When the circuit is set in operation, the potentiometer 66 is set for a particular frequency. As long as the oscillator V1 oscillates at the frequency selected, the frequency $F_c$ put out by the mixer 60 will remain constant and consequently the output of the counter demodulator will remain constant with $V_o=V_p$. Thus, $V_c=0$. If for any reason the frequency $F_{osc}$ of the oscillator V1 should shift from its desired value, the output frequency $F_c$ of the mixer 60 will change to alter the output voltage $V_o$ of the counter demodulator 64, increasing with increase of frequency and decreasing with decrease of frequency. Consequently $V_o$ will no longer be equal to $V_p$ and the correcting voltage $V_c$ which is the sum of $V_o$ and $V_p$ will be developed with a polarity depending on the direction of frequency shift. The voltage $V_c$ is then amplified if the amplifier 70 is used and is applied to the grid of the reactor to shift its reactance in order to retune the oscillator V1 to the same frequency as that appearing on the calibrated potentiometer 66.

Figure 8:
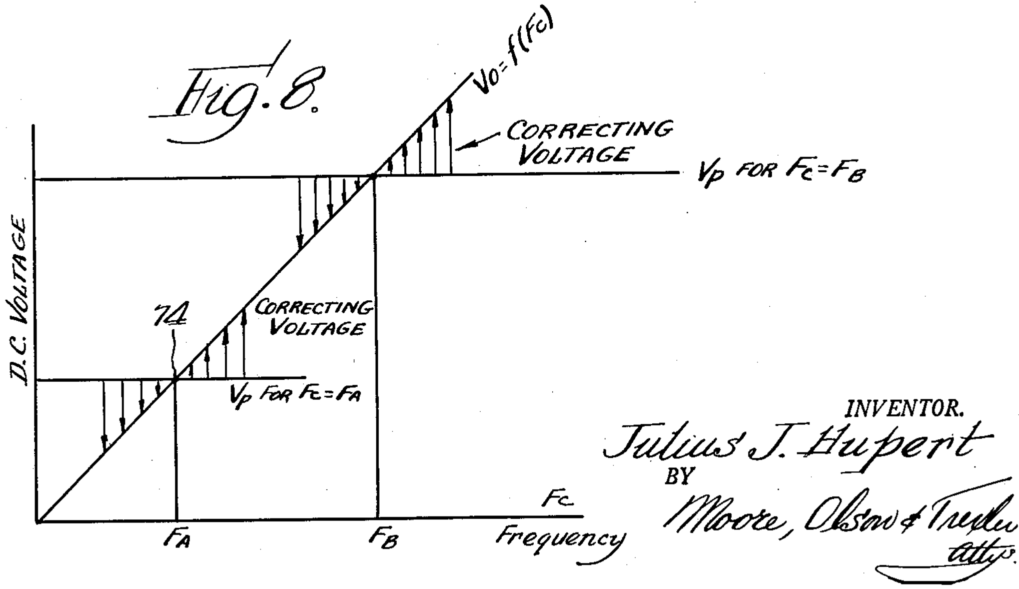
Figure 8 is a diagram illustrating the voltage relationships in the circuit of Figure 7.

In Figure 8 is shown a diagram indicating the operation of the frequency stabilizing circuit for two different values of the crossover frequency, $F_c$, which is dependent on the carrier frequency. At the lower of these, $F_A$, there is indicated a point 74 on the calibration curve which on the vertical axis indicates the D. C. output voltage, $V_p$, of the potentiometer 66, and also the D. C. output voltage, $V_o$, of the counter demodulator 64. As the frequency $F_C$ moves from $F_A$ to a lower value, it will be seen by referring to the calibration curve that the voltage $V_o$ decreases. $V_c$, the difference between $V_p$ and $V_o$ is indicated by the downwardly pointed arrows. When the frequency increases above $F_A$ the voltage $V_o$ increases and the arrows are indicated as pointing upwardly. A similar situation is indicated at $F_B$ which represents a different value of the crossover frequency $F_C$ from the mixer 60.

Operation of the demodulator may be readily understood with reference to Figure 6 in which the sine wave voltage $F_C$ is applied to an amplifier 76 comprising the first stage of the counter demodulator. The voltage is amplified as indicated above the block diagram and is fed to a square wave clipper 78 which produces a square wave as indicated on the diagram, and this is fed to an amplifier 80 which supplies an amplified square wave to the grid of an electron tube 82. Plate potential is supplied to the tube 82 through a resistor 84 from a suitable D. C. source. The voltage appearing at the junction 86 of the resistor 84 and the plate of the tube 82 is a square wave, as indicated on the drawing. This voltage is supplied through a coupling capacitor 88 to a junction 90 on a rectifier circuit comprising a series combination of rectifier 92, resistor 94, resistor 96 and rectifier 98, the junction between resistors 94 and 96 being grounded. An output is taken across the resistor 94 by means of a resistor 100 and capacitor 102. Due to the rectification of the rectifier 92 this output appears substantially as a saw tooth as indicated on the drawing. The rectifier 98 prevents a charge from building up on the capacitor 88. It may be seen that due to the action of the square wave clipper the amplitude of the input voltage has no effect upon the output and that as one saw tooth or pip of voltage appears across the resistor 94 for each cycle of the input frequency, the capacitor 102 will charge to a value dependent upon the frequency supplied to the counter demodulator.

It is apparent that I have herein presented circuits attaining each of the listed objects and others. Although certain embodiments have been shown and described, it is to be understood that these are for illustrative purposes only and that my invention comprises all that fairly falls within the spirit and scope of the appended claims.

I claim:

1. In a frequency modulation transmitter, an oscillator including an oscillator tube having a grid, plate and cathode, a reactance tube having a grid, plate and cathode, the cathode of the reactance tube being connected to the cathode of said oscillator tube, an oscillator tank coil having one end thereof directly connected to the plate of said oscillator tube and the other end thereof directly connected to the plate of said reactance tube, said coil and the interelectrode anode to cathode capacitances of said oscillator tube and said reactance tube being connected in series circuit to form the frequency determining circuit of said oscillator, a reactance containing feed-back connection from said coil to the grid of said oscillator tube, and means for applying a modulating signal voltage to the grid of said reactance tube to vary the tuning and frequency of said oscillator.

2. In a radio frequency modulation transmitter, an oscillator including an oscillator tube having a grid and plate and cathode, a reactance tube having a grid and plate and cathode, the cathode of said reactance tube being connected to the cathode of said oscillator tube, an oscillator tank coil having one end thereof directly connected to the plate of said oscillator tube and the other end thereof directly connected to the plate of said reactance tube, said coil and the interelectrode anode to cathode capacitances of said oscillator tube and said reactance tube being connected in series circuit to form the frequency determining circuit of said oscillator, all portions of said oscillator coil being free of connections to RF ground during operation, a condenser connected at one end to the plate of said reactance tube and at the other end to the grid of said oscillator tube, a high valued resistance connected between the grid and cathode of said oscillator tube, a low valued resistance connected at one end to the grid of said reactance tube and at the other end connected through a radio frequency by-pass condenser to the cathode of said reactance tube to form with the internal grid-to-plate capacitance of said reactance tube a phase shifting circuit for the grid of said reactance tube, and means for applying a modulating signal bias to the grid of said reactance tube to vary the tuning and frequency of said oscillator.

3. In a frequency modulation transmitter, an oscillator including an oscillator triode tube having a grid and plate and cathode, a reactance triode tube having a grid and plate and cathode, the cathode of said reactance tube being connected to the cathode of said oscillator tube, an inductive impedance having one end thereof connected to the plate of said oscillator tube and the other end thereof connected to the plate of said reactance tube, said impedance and the interelectrode anode to cathode capacitances of said oscillator tube and said reactance tube being connected in series circuit to form the frequency determining circuit of said oscillator, a feed-back connection between the plate of said reactance tube and the grid of said oscillator tube, a high valued resistance between grid and cathode of said oscillator tube, a phase shifting network including the cathode-to-grid interelectrode capacitance of the reactance tube and a low valued resistance connected at one end to the grid of said reactance tube and at the other end connected through a radio frequency by-pass condenser to the cathode of said reactance tube, said grid resistance of low value comprising a useful load, and means for applying a modulating signal bias to the grid of said reactance tube to vary the tuning and frequency of said oscillator.

4. In a frequency modulation transmitter, an oscillator including an oscillator tube having a grid and plate and cathode, a reactance tube having a grid and plate and cathode, the cathode of said reactance tube being connected to the cathode of said oscillator tube, a shorted transmission line connected at one end to the plate of said oscillator tube and at the other end to the plate of said reactance tube, said shorted transmission line and the interelectrode capacitances of said oscillator tube and said reactance tube being connected in series circuit to form the frequency determining circuit of said oscillator, a phase shifting network including the interelectrode grid-to-plate capacitance of said reactance tube, and a transmission line connected at one end to the grid of said reactance tube and at the other end through an impedance to the cathode of said reactance tube, said last mentioned transmission line having a length equal to a quarter wave length at the frequency of said oscillator, said impedance being a useful load.

References Cited in the file of this patent

UNITED STATES PATENTS 2,279,030 Winlund ---------------- Apr. 7, 1942

(Other references on following page)

UNITED STATES PATENTS

| | | |
|---|---|---|
| 2,319,535 | Davies | May 8, 1943 |
| 2,382,198 | Bollinger | Aug. 14, 1945 |
| 2,406,125 | Ziegler et al. | Aug. 20, 1946 |
| 2,422,424 | Landon | June 17, 1947 |
| 2,441,504 | O'Brien | May 11, 1948 |
| 2,450,182 | Burroughs | Sept. 28, 1948 |
| 2,491,590 | Sorensen | Dec. 20, 1949 |
| 2,495,776 | Royden | Jan. 31, 1950 |
| 2,510,982 | Kondoian | June 13, 1950 |
| 2,514,087 | Phelan | July 4, 1950 |
| 2,521,694 | Crosby | Sept. 12, 1950 |
| 2,526,353 | Harralson | Oct. 17, 1950 |
| 2,600,124 | Mortley | June 10, 1952 |
| 2,605,425 | Hugenholtz | July 29, 1952 |
| 2,613,347 | Todd | Oct. 7, 1952 |